MAGNETIC TAPE TRANSPORT HEAD ASSEMBLY WITH AZIMUTH ADJUSTMENT

Filed March 18, 1965 3 Sheets-Sheet 1

INVENTOR.
JOHN B. KELLY
BY
Carl V. Olson
Attorney

MAGNETIC TAPE TRANSPORT HEAD ASSEMBLY WITH AZIMUTH ADJUSTMENT

Filed March 18, 1965 3 Sheets-Sheet 2

INVENTOR.
JOHN B. KELLY
BY
Carl V. Olson
Attorney

MAGNETIC TAPE TRANSPORT HEAD ASSEMBLY WITH AZIMUTH ADJUSTMENT

Filed March 18, 1965 3 Sheets-Sheet 3

INVENTOR.
JOHN B. KELLY
BY Carl V. Olson
Attorney

United States Patent Office 3,457,556

Patented July 22, 1969

3,457,556

MAGNETIC TAPE TRANSPORT HEAD ASSEMBLY WITH AZIMUTH ADJUSTMENT

John B. Kelly, Haddonfield, N.J., assignor to Radio Corporation of America, a corporation of Delaware Filed Mar. 18, 1965, Ser. No. 440,733
Int. Cl. G11b 5/56
U.S. Cl. 340—174.1 9 Claims

ABSTRACT OF THE DISCLOSURE

Magnetic head assembly with collective and individual adjustment of read head and write head blocks. A read head block and a write head block are supported with relation to the tape station frame by a first notched support member permitting azimuth adjustment of both heads together. The read head block is permanently affixed to an intervening second notched support member, and the write head block is releasably affixed to it. Azimuth adjustment of the write head block relative to the read head block is by means of a fulcrum strip between the blocks, and bolts through the blocks. The assembly is unusually rigid and stable in adjusted condition.

This invention relates to magnetic tape transports used in the magnetic recording and reproducing of information, and particularly to the mounting of multiple-channel reading and writing means with adjustability in the azimuth direction, which is a direction parallel to the surface of the magnetic tape and normal to the direction of motion of the magnetic tape.

In tape transports for multi-track magnetic tape, the air gaps of a plurality of read head magnetic cores are arranged along a read gap line extending transversely of the tape, and the air gaps of an equal plurality of write head magnetic cores are arranged along a parallel write gap line. The read and write heads may be imbedded in a single rigid block to form a so-called dual head wherein the relative alignments of the read and write head gaps are fixed in parallel relationship as accurately as possible. A magnetic tape recorded on such a dual head in one tape transport may reveal that the dual head in another tape transport used for reproducing the recorded information has slightly different alignments of the read and write head gap lines. Differences in the fixed relative alignments of read and write head gap lines are particularly troublesome in the case of heads made at different times, or made by different manufacturers. Misalignment of the read head gap line in the azimuth direction, relative to the recorded information on the several tracks, results in a static skew, in time, of the reproduced signals from the several tracks, which limits the information packing density and speed of operation attainable.

To overcome the difficulties of fixed single-block read-write heads, separate read-head and write-head blocks have been constructed with means for adjusting the relationship between the read block and the write block to establish parallelism between the gap lines of the two blocks, It has been found to be difficult to adjustably mount read and write head blocks with a sufficient rigidity so that an adjustment, once achieved, is maintained indefinitely in use. This can be appreciated when it is understood that the parallel alignment of the read and write gap lines should be maintained with an accuracy of within about 50 micro-inches.

The difficulties are magnified when it is desired to employ adjustable read and write head blocks dimensioned to provide a close spacing, such as 0.150 inch, between the read gap line of the read block and the write gap line of the write block. In this case, each read and write block, which is necessarily made of two parts, is itself lacking in the desired rigidity. The close spacing of the read gap line and the write gap line is desired to minimize the length of magnetic tape required for the recording of a message of given length. This results from the fact that during a pass of tape over the write gaps, the read gaps are employed to reproduce the recorded signals for error checking purposes.

It is a general object of this invention to provide an improved mounting for read and write magnetic heads whereby they may conveniently and accurately be adjusted in azimuth relative to the tape transport frame, and relative to each other.

It is another object to provide an improved adjustable mounting for read and write head blocks constructed with a close spacing of the read gap line and the write gap line.

According to an example of the invention, there is provided a mounting assembly providing collective and individual azimuth adjustment of read and write head blocks. The assembly includes a first support member having a fixed portion affixed to the tape transport frame and having a movable portion adjustably coupled to the frame to provide an azimuth adjustment in unison of both the read head block and the write head block. A second support member has a fixed portion affixed to the movable portion of the first member and has a movable portion. A read head block is permanently affixed to the fixed portion of the second member, and a write head block is releasably affixed to the movable portion of the second member. An elongated fulcrum strip is centrally disposed between the read and write head blocks and extends in a direction normal to read and write gap lines of the blocks. Two adjusting screws pass through the ends of the read and write blocks remote from the fulcrum strip for compressing the blocks against the fulcrum strip. Differential turning of the two adjusting screws causes a rocking of the write head block about the fulcrum strip for accurately establishing parallelism of the write head relative to the read head.

Figure 1:
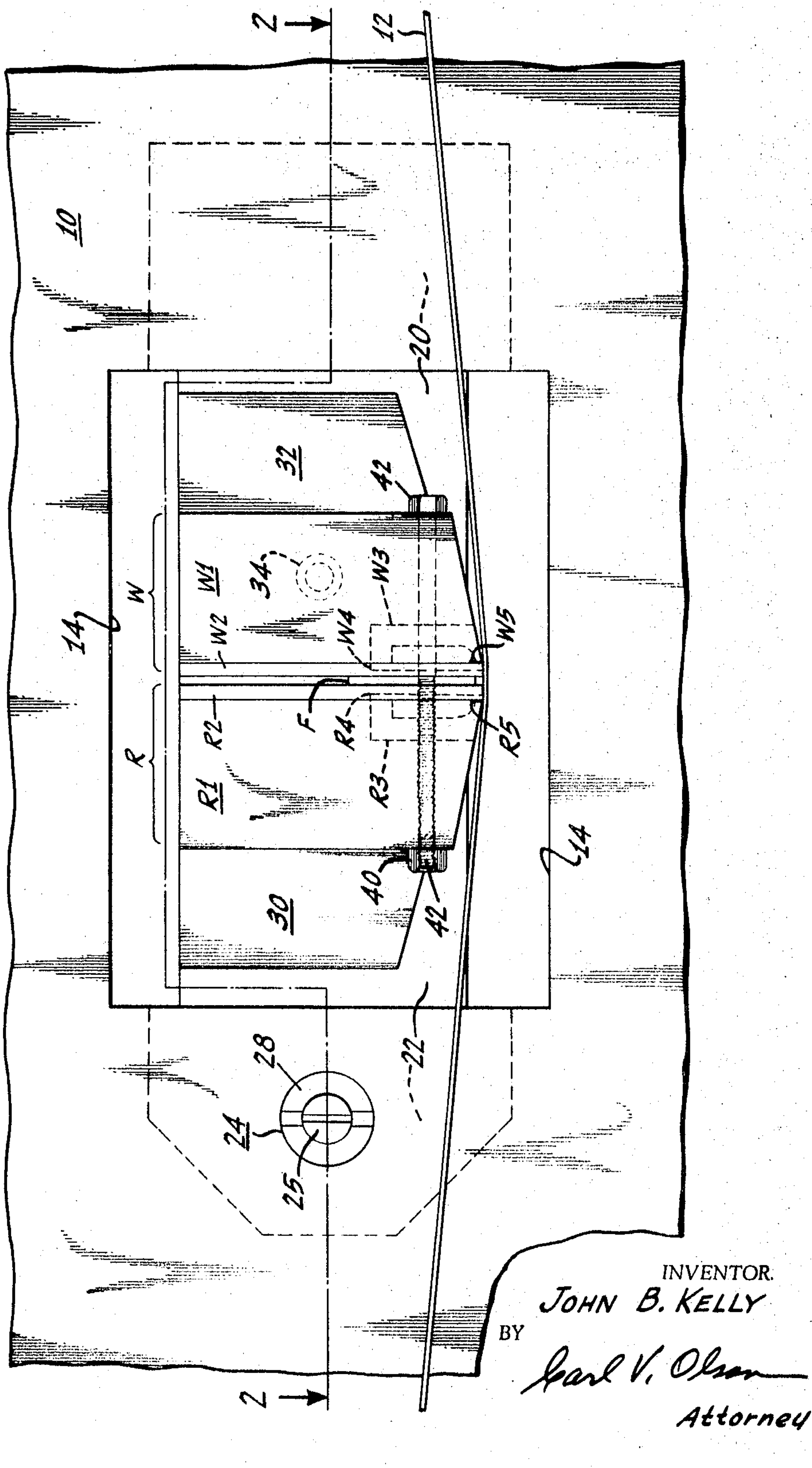
FIG. 1 is an elevation of the portion of a magnetic tape transport in which magnetic heads are mounted for cooperation with a moving magnetic tape.
Figure 2:
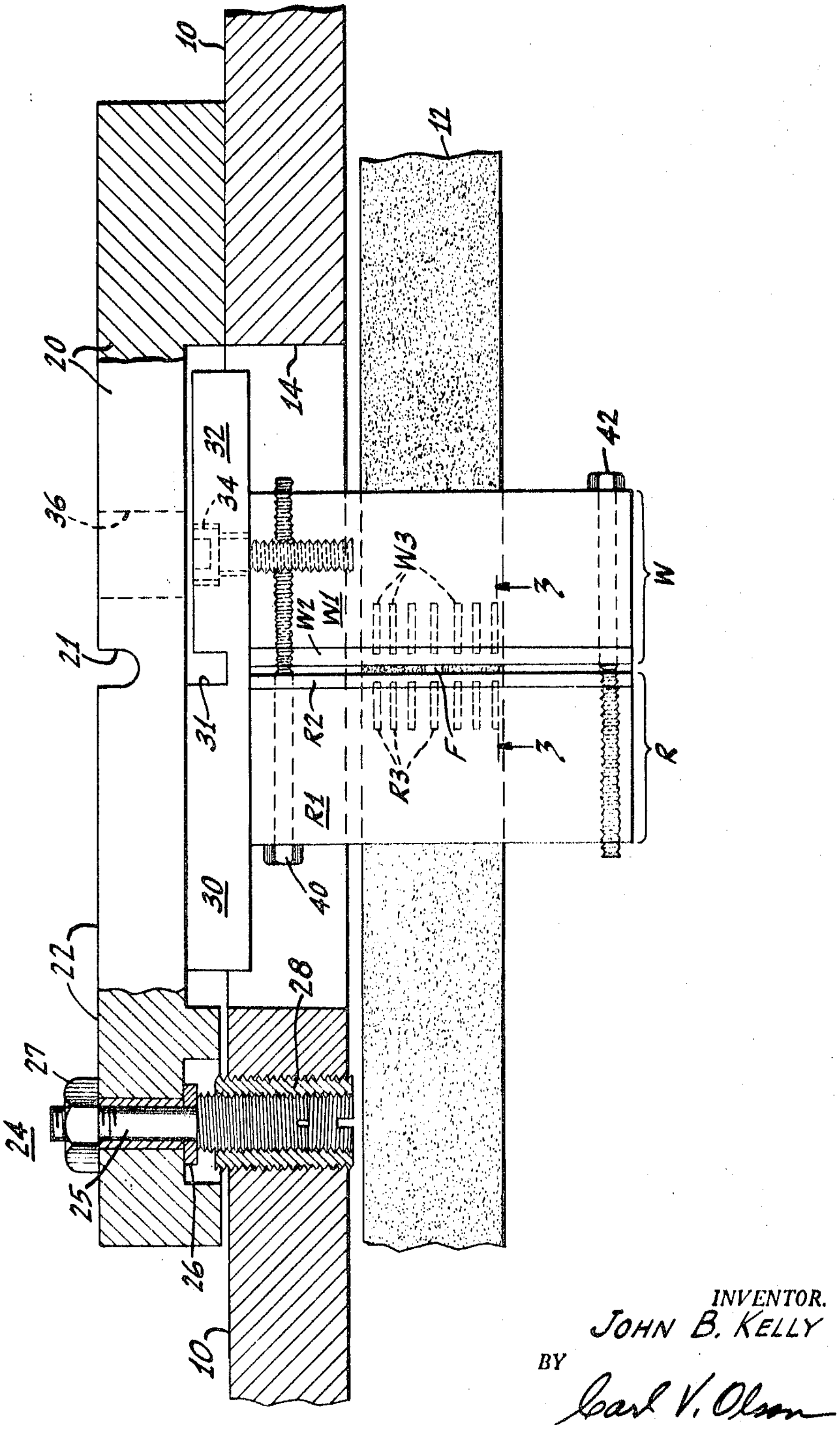
FIG. 2 is a view, partly in section, taken on the line 2—2 of FIG. 1 and looking in the direction of the arrows.

Referring now in greater detail to the drawing, there is shown a nagnetic tape transport frame 10 which serves as a stable reference for the guiding of a magnetic tape 12. The magnetic tape 12 is guided by roller and other anti-friction means (not shown) mounted on the frame 10. The frame 10 is provided with an opening 14 for the mounting therein of an adjustably positioned read head block R and a write head block W.

The read head block R consists of a block of non-magnetic material such as brass having a plurality of imbedded magnetic cores with air gaps positioned along a read gap line R5 extending transverse to the longitudinal direction of the magnetic tape 12. The write head block W similarly consists of a block of non-magnetic material having a plurality of imbedded magnetic cores with air gaps arranged along a write gap line W5. It is important that the read gap line R5 of the read block be precisely parallel with the write gap line W5 of the write block. It is also important that gap lines R5 and W5 be precisely transverse to the longitudinal direction of motion of the magnetic tape 12.

The read head block R and the physically separated write head block W are adjustably mounted with reference to the frame 10, and thus with reference to the magnetic tape 12, by means including a first mounting member 20, 22 consisting of a fixed portion 20 and a movable portion 22 separated by an intermediate notch 21. The notch 21 is dimensioned to sufficiently weaken the member so that the remaining material acts as a hinge between the portions 20 and 22 for very slight movements of the movable portion 22. The fixed portion 20 of the member 20, 22 is mounted in fixed permanent relation on the frame 10 by conventional means not shown. The movable portion 22 of the member 20, 22 is mounted in adjustable relation to the frame 10 by means of a differential screw assembly 24. The assembly 24 includes a stud 25 having a shank bolted in fixed immovable relation to the portion 22 by means of a washer 26 and a nut 27. The assembly also includes an adjusting sleeve 28 having internal threads engaging the threads of the stud 26 and having external threads engaging threads in the frame 10. If the sleeve 28 has internal threads which are coarser than its external threads, a right hand turning of the sleeve 28 causes portion 22 of member 20, 22 to be drawn toward the frame 10. The differential screw assembly 24 constitutes an adjustable coupling between the movable portion 22 of the member 20, 22 and the frame 10.

A second mounting member 30, 32 consists of a fixed portion 30 and a movable portion 32 separated by a notch 31. The fixed portion 30 of the second mounting member 30, 32 is permanently affixed to the movable portion 22 of the first mounting member 20, 22. The first and second mounting members 20, 22 and 30, 32 are most conveniently constructed, as shown, of two pieces of material joined together. However, they can be made of one unitary piece of material, if desired. The mounting members are preferably made of a non-magnetic material such as aluminum having thickness dimensions making them dimensionally rigid at all places except where they are weakened by the notches 21 and 31.

The read head block R is permanently affixed to the fixed portion 30 of the second mounting member 30, 32 by conventional means (not shown). The write head block W is releasably affixed to the movable portion 32 of the second mounting member 30, 32 by means of a bolt 34 having a head to which access may be had through a hole 33 in member 20, 22.

Figure 3:
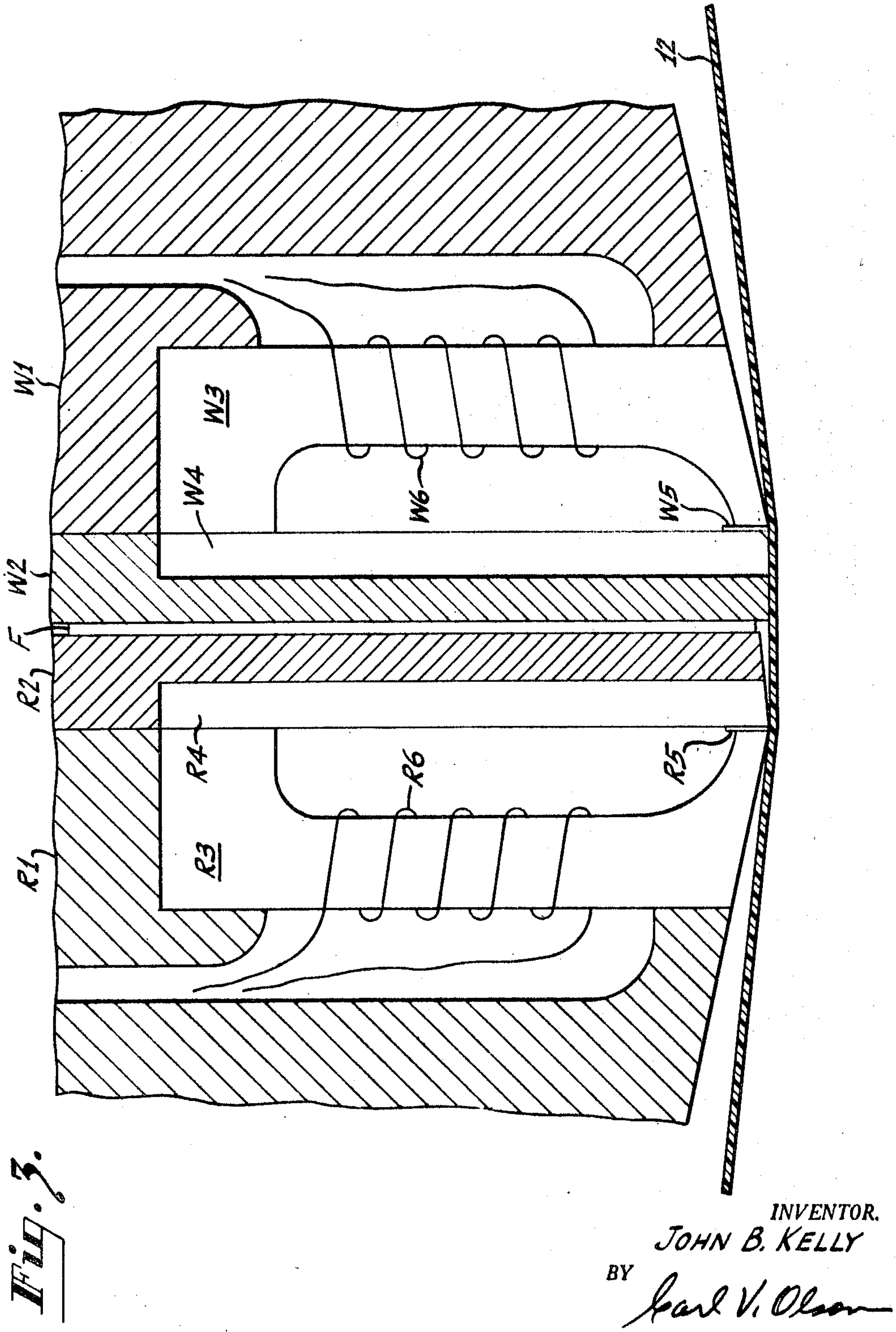
FIG. 3 is a fragmentary sectional view taken on the line 3—3 of FIG. 2.

Read head block R consists of a block R1 and a plate R2, both made of a non-magnetic material such as brass. The block R1 and plate R2 are fastened together by conventional means such as screws (not shown). A plurality of magnetic C-shaped cores R3 are imbedded in the block R1, and an equal plurality of I-shaped cores R4 are imbedded in plate R2. Each C-shaped core and associated I-shaped core cooperate to form a magnetic path loop having a read gap along the read gap line R5. The read gaps may be air, but a gap-spacer strip of non-magnetic material shown as R5 in FIG. 3 is preferably positioned between block R1 and plate R2 to define the gaps in all the read cores. The gap-spacer strip may have a thickness of about 100 or 200 microinches (0.0001 or 0.0002 inch). An electrical read coil R6 is wound around each C-shaped core.

The write head block W is constructed like the read head block R. The corresponding parts bear the same numerals with the prefix W substituted for the prefix R.

An elongated fulcrum spacer F is centrally disposed (in relation to the magnetic cores) between the read head block R and the write head W. The fulcrum spacer F extends in a direction parallel to the direction of the mounting surfaces of the blocks on the support member 30, 32, and in a direction normal to the directions of the read and write gap lines R5 and W5. A bolt 40 passes through the blocks R and W near their mounting surfaces for urging the mounting surface end of the write block W toward the read block R. The bolt 34 is loosened when bolt 40 is adjusted to temporarily allow the write block W1 to move slightly along portion 32 of support member 30, 32. A bolt 42 passes through the blocks R and W near their free ends for urging the free end of write block W toward the free end of read block R. When both bolts 40 and 42 are tight, the blocks R and W are compressed against the fulcrum F between the blocks. By loosening one bolt and tightening the other, the write head can be made to swing about the fulcrum F. In this way, the parallelism between the blocks and their gap lines can be adjusted.

The fulcrum strip F and the bolts 40, 42 provide a means for adjusting parallelism of the read and write gap lines, and they also impart an unusual rigidly and stability to the read and write head assembly. The read head R includes a relatively thin plate R2 containing the flush imbedded I-shaped magnetic cores R4. The plate R2 can be fastened to the block R1 only at places removed on both sides from the cluster of magnetic cores imbedded in the two pieces. Therefore, the thin plate R2 and cores R4 tend to bow away from the block R1 and cores R3 at the center of the cluster of magnetic cores. The fulcrum strip F placed at the center of the cluster of magnetic cores cooperates with the compressive force imparted by bolts 40 and 42 to maintain the thin plate R2 and its flush imbedded cores R4 tightly compressed against the block R1 and its flush imbedded cores R3. Also, at the same time and by the same means, the thin plate W2 and its flush imbedded cores W4 of the write head block W are tightly compressed against the block W1 and its flush imbedded cores W3.

The described advantage of the construction including the fulcrum strip F is increasingly important when it is desired to construct a read-write head assembly in which the spacing of the read and write gap lines is reduced. By reducing the spacing of the read and write gap lines, a reduction is made in the length of magnetic tape needed for the storage of a block of information. This results from the fact that, when writing, the reading head is also employed to read what has been recorded, for error checking purposes. The closer the spacing of the read and write gap lines, the thinner are the plates R2 and W2, and the more important is the rigidity and stability imparted by the fulcrum strip F.

The procedure for adjusting and setting the positions of the read and write head blocks will now be described. It will be understood that the fixed mounting surfaces between the frame 10, support members 20, 22 and 30, 32, and blocks R and W are made as flat and true as possible to minimize the amount of adjustment necessary. The bolt 34 is loosened to a tightness of about three inch-pounds to permit a sliding of the mounting surface of the write block W on the portion 32 of the second support member 30, 32 during a subsequent adjustment of bolts 40, 42. The differential screw 24 is adjusted by turning the threaded sleeve 28 to move the movable portion 22 of the first support member 20, 22, the portion 30 fixed thereto of the second support member 30, 32, and the read head block R. A correct azimuth adjustment (perpendicular to the direction of tape travel) of the read gap line R5 is detected by observing the timing of the multi-channel electrical signals read when a prerecorded standard test tape is operated in the tape station.

The parallelism of the write gap line W5 with relation to the read gap line R5 is adjusted by differentially turning the bolts 40 and 42. One bolt is tightened the same amount that the other has been loosened to maintain a constant pressure on the fulcrum strip F. The accuracy of the parallelism adjustment of the write gap W5 is detected by using the write head to record multi-channel information on a moving tape, and then observing the timing of the reproduced multi-channel electrical signals derived from the read head. When the adjustment is perfected, the loosened bolt 34 is returned to a tightness of about twelve inch-pounds. The entire adjustment procedure may be repeated if made necessary by a later adjustment having affected a previous one. Once a correct adjustment is achieved, the assembly remains unusually stable and rigid during continued use of the tape station.

What is claimed is:

1. In a magnetic tape transport,
two head blocks each having the air gaps of a plurality of imbedded magnetic cores extending along a gap line,
an elongated fulcrum strip centrally disposed between said head blocks and extending in a direction normal to said gap lines, and
adjustable means on ends of said blocks remote from said fulcrum strip for urging said ends together and compressing said blocks against said fulcrum strip.

2. The combination of
a read head block having the air gaps of imbedded read head magnetic cores extending along a read gap line, and a write head block having the air gaps of imbedded write head magnetic cores extending along a write gap line,
an elongated fulcrum centrally disposed between said blocks and extending in a direction normal to said read and write gap lines, and
adjustable means on ends of said blocks remote from said fulcrum for compressing said blocks against said fulcrum to accurately establish parallelism between said read and write gap lines.

3. The combination of
a read head block having the air gaps of imbedded read head magnetic cores extending along a read gap line, and a write head block having the air gaps of imbedded write head magnetic cores extending along a write gap line,
an elongated fulcrum strip between said two head blocks and disposed centrally with relation to said imbedded magnetic cores and normal to said read and write gap lines, and
adjustable means on ends of said blocks remote from said elongated fulcrum strip for urging said ends together and compressing said two head blocks against said fulcrum strip.

4. Two head blocks each including a block of nonmagnetic material having a plurality of C-shaped magnetic cores imbedded therein and a plate of non-magnetic material having an equal plurality of I-shaped magnetic cores imbedded therein and arranged to cooperate with the C-shaped magnetic cores to provide a plurality of magnetic flux path loops having air gaps arranged along a gap line,
an elongated fulcrum strip between the plates of said two head blocks and disposed centrally with relation to said imbedded magnetic cores and normal to said gap lines, and
adjustable means on the ends of said head blocks remote from said elongated fulcrum strip for urging said ends together and compressing said head blocks against said fulcrum strip.

5. In a magnetic tape transport, an adjustable assembly of read and write head blocks, comprising
a support member,
a read head block having the air gaps of imbedded read head magnetic cores extending along a read gap line, and a write head block having the air gaps of imbedded write head magnetic cores extending along a write gap line, one of said blocks having a mounting surface normal to its gap line permanently affixed to said support member and the other of said blocks having a mounting surface normal to its gap line releasably affixed to said support member,
an elongated fulcrum strip centrally disposed between said blocks and extending in a direction parallel to said mounting surfaces of said blocks and normal to said read and write gap lines, and adjustable means on ends of said blocks remote from said fulcrum strip for compressing said blocks against said fulcrum strip to accurately establish parallelism between said read and write gap lines.

6. In a magnetic tape transport, an adjustable assembly of read and write head blocks, comprising
a support member having an intermediate notch defining a first portion on one side of said notch and a second portion on the other side of the notch,
a read head block having the air gaps of imbedded read head magnetic cores extending along a read gap line, and a write head block having the air gaps of imbedded write head magnetic cores extending along a write gap line, one of said blocks having a mounting surface normal to its gap line permanently affixed to the first portion of said support member and the other of said blocks having a mounting surface normal to its gap line releasably affixed to the second portion of said support member,
an elongated fulcrum strip centrally disposed between said blocks and extending in a direction parallel to said mounting surfaces of said blocks and normal to said read and write gap lines, and
adjustable means on ends of said blocks remote from said fulcrum strip for compressing said blocks against said fulcrum strip to accurately establish parallelism between said read and write gap lines.

7. In a magnetic tape transport, an adjustable assembly of head blocks, comprising
a support member having an intermediate notch defining a first portion on one side of said notch and a second portion on the other side of the notch,
two head blocks each including a block of non-magnetic material having a plurality of C-shaped magnetic cores imbedded therein and a plate of non-magnetic material having an equal plurality of I-shaped magnetic cores imbedded therein and arranged to cooperate with the C-shaped magnetic cores to provide a plurality of magnetic flux path loops having air gaps arranged along a gap line, one of said head blocks having a mounting surface normal to its gap line permanently affixed to the first portion of said support member and the other of said blocks having a mounting surface normal to its gap line releasably affixed to the second portion of said support member,
an elongated fulcrum strip between the plates of said two head blocks and disposed centrally with relation to said imbedded magnetic cores and normal to said gap lines, and
adjustable means on the ends of said head blocks remote from said elongated fulcrum strip for urging said ends together and compressing said head blocks against said fulcrum strip.

8. In a magnetic tape transport, a mounting assembly providing collective and individual azimuth adjustment of reading and writing head blocks, comprising
a tape transport frame and guide for a magnetic tape,
a first support member having an intermediate notch, having a fixed portion on one side of said notch affixed to said frame and having a movable portion on the other side of said notch adjustably coupled to said frame,
a second support member having an intermediate notch, having a fixed portion on one side of said notch affixed to the movable portion of said first member and having a movable portion extending near the fixed portion of said first member,
a read head block having the air gaps of imbedded read head magnetic cores extending along a read gap line, and a write head block having the air gaps of imbedded write head magnetic cores extending along a write gap line, one of said blocks having a mounting surface normal to its gap line permanently affixed to the fixed portion of said second member and the other of said blocks having a mounting surface normal to its gap line releasably affixed to the movable portion of said second member, an elongated fulcrum strip centrally disposed between said blocks and extending in a direction parallel to said mounting surfaces of said blocks and normal to said read and write gap lines, and adjusting screws through said blocks on both sides of said fulcrum strip for accurately establishing parallelism between said read and write gap lines.

9. In a magnetic tape transport, a mounting assembly providing collective and individual azimuth adjustment of reading and writing head blocks, comprising a tape transport frame and guide for a magnetic tape, a first support member having an intermediate notch, having a fixed portion on one side of said notch affixed to said frame and having a movable portion on the other side of said notch adjustably coupled to said frame, a second support member having an intermediate notch, having a fixed portion on one side of said notch affixed to the movable portion of said first member and having a movable portion extending near the fixed portion of said first member, read and write head blocks each including a block of non-magnetic material having a plurality of C-shaped magnetic cores imbedded therein and a plate of non-magnetic material having an equal plurality of I-shaped magnetic cores imbedded therein and arranged to cooperate with the C-shaped magnetic cores to provide a plurality of magnetic flux path loops having air gaps arranged along a gap line, one of said head blocks having a mounting surface normal to its gap line permanently affixed to the fixed portion of said second member and the other of said blocks having a mounting surface normal to its gap line releasably affixed to the movable portion of said second member, an elongated fulcrum strip between the plates of said two head blocks and disposed centrally with relation to said imbedded magnetic cores and normal to said gap lines, and adjusting screws through the ends of said head blocks remote from said elongated fulcrum strip for urging said ends together and compressing said head blocks against said fulcrum strip.

References Cited

UNITED STATES PATENTS

| | | | |
|---|---|---|---|
| 3,154,372 | 10/1964 | Kolm | 340—174.1 |
| 3,373,248 | 3/1968 | Baybick et al. | 179—100.2 |

FOREIGN PATENTS

| | | |
|---|---|---|
| 676,810 | 6/1939 | Germany. |

BERNARD KONICK, Primary Examiner

BARRY L. HALEY, Assistant Examiner

U.S. Cl. X.R.

179—100.2